March 20, 1928.

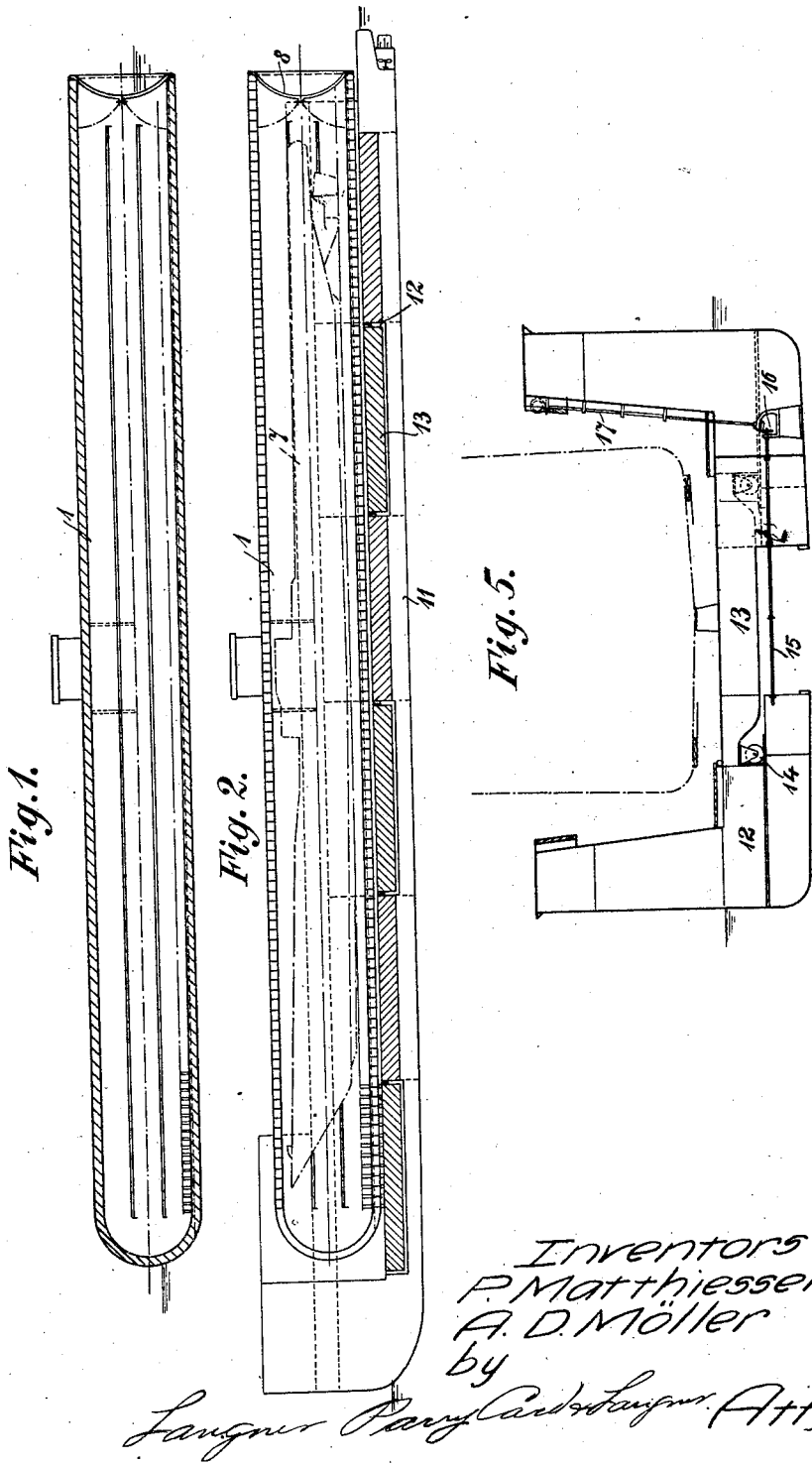

P. MATTHIESSEN ET AL 1,663,346

TESTING DOCK FOR SUBMARINES

Filed May 12, 1926  2 Sheets-Sheet 2

Inventors
P. Matthiessen
A. D. Möller
by
Langner Parry Card & Langner Atty's.

Patented Mar. 20, 1928.

1,663,346

UNITED STATES PATENT OFFICE.

PAUL MATTHIESSEN AND ADOLF DETLEF MÖLLER, OF HAMBURG, GERMANY.

TESTING DOCK FOR SUBMARINES.

Application filed May 12, 1926, Serial No. 108,626, and in Germany May 18, 1925.

The present invention refers to a testing dock for sub-marines comprising a well known buoyant testing cylinder the buoyancy chambers of which are of such large dimensions that they are sufficient for assuring the buoyancy of the cylinder, and that for draining or for positioning the testing cylinder out of water an independent dock is employed which also may be used for itself. Since the weight of the testing cylinder including the sub-marine contained therein and the water is very considerable, the dock which answers the requirement that the testing cylinder exactly fits therein, on the one hand must have an extraordinarily large carrying power, and on the other hand must be at a certain distance apart from the side walls, which cannot be in agreement with the breadth of ordinary ships, the tonnage of which would correspond to the carrying power of the dock. Thus the dock cannot be fully utilized.

To avoid these drawbacks a dock is used, which is so constructed that it is divided along its centre plane into two chamber-like dock halves which interlock or engage one another and which are shiftable against one another transversally to the longitudinal axis, and which eventually in closed-up position supplement one another to a ship's hull, while each dock-half is buoyant for itself, so that the two halves can either float singly or together in engagement with one another, while being adapted to alternatively dock themselves.

The testing cylinder is on its complete circumference preferably constructed of hollow walls in a known manner. The buoyant chambers, which render the testing cylinder floatable and steady, run along the complete length of the testing cylinder and not beyond the horizontal central plane. They preferably constitute one part of the space of the hollow mantle, and by suitably bulkheads care is taken that according to need either only the buoyancy chambers or the complete hollow mantle may be flooded in known manner at a uniform water pressure. The pumps or the plant of pumps serving to flood or fill the buoyancy chambers is arranged on the testing cylinder itself.

The invention is illustrated by the accompanying drawings.

Fig. 1 is a longitudinal section of a testing cylinder.

Fig. 2 is a similar section of a testing cylinder introduced into a dry dock.

Fig. 5 is a cross section of the dock in expanded position, and

Figure 3:
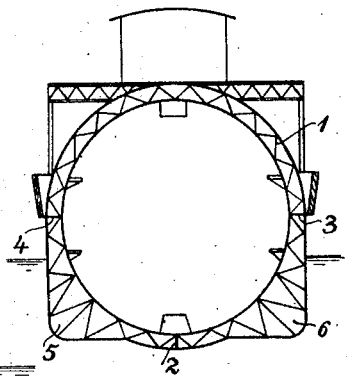
Fig. 3 is a cross section of the testing cylinder to a larger scale.
Figure 6:
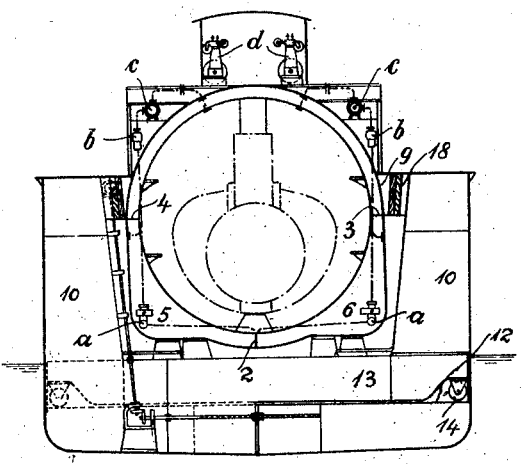
Fig. 6 is a cross section of the testing cylinder within the dry dock showing a plant of pumps.

The testing cylinder 1 is hollow about its complete circumference, and the hollow spaces are divided into longitudinal spaces by the longitudinal bulkheads 2, 3 and 4. The bottom spaces 5 and 6, which are constructed to form boxes, Fig. 3, can be filled with ballast water to uphold the steadiness during the self-floating of the cylinder, and eventually sufficiently to lower the latter to allow the introduction of the sub-marine 7. The testing cylinder 1 is then closed up at its rear opening by a cover or joint 8, whereupon the inner space is emptied by the pumps, so that it can be transported together with the docked sub-marine floatingly. If desired of course the sub-marine might be introduced into the testing cylinder after being docked.

The longitudinal bulkheads 2, 3 and 4 are provided with slides or shutters, so that the single chambers of the space of the hollow mantle may be made to communicate with one another. The operation of testing is then carried out in this way that first of all the space of the hollow mantle is filled with compressed water up to 5 atm., and that thereupon the pressure within the testing cylinder is increased up to 10 atm. The inner and outer walls of the testing cylinder are therefore only subjected to 5 atm.

Figure 4:
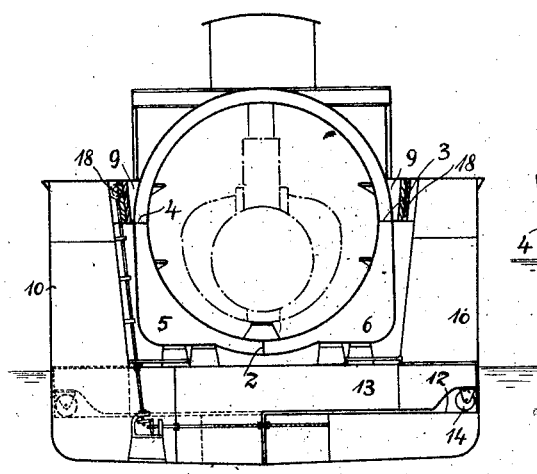
Fig. 4 is a cross section of a testing cylinder arranged within a dry dock.

In Fig. 4 the testing cylinder is shown with a dry dock in such manner that it snugly fits within the corresponding floating dock thus resting not only on suitable bilge blocks on the bottom but also engaging certain parts 18 of the inner wall of the lateral boxes of the dock. With this object in view blocks 9 are provided. The weight of the testing cylinder including that of the ballast and compressed water would necessitate a dock of 10,000 tons carrying power. Commercial ships of 10,000 tons own weight require a span of the dock of 21 to 22 m., which would not be in agreement with the diameter of the testing cylinder. For this reason the dock is therefore divided into two halves in longitudinal direction of which each comprises one of the two lateral boxes 10, one half of the bottom box 11 and alternating tongues 13, which project beyond the divisional plane of the bottom box and are cut out from the upper part of the bottom box of the other dock-half having corresponding gaps 12 in its own bottom part in such way that the two dock-halves at a certain height above the floor of the bottom box interlock like a comb. The tongues 13 of each dock-half which project under the lateral box 10 of the other dock-half are guided on rails of the subjacent portion of the bottom box of this half by rollers 14, and when so adjusted they may be locked in position. The operation of adjusting the two halves against one another may be carried out by screw spindles 15 with left- and right-hand threads which are coupled at 16 with the bilge blocks 17. The dock-halves are floatable and transportable each for themselves, and when engaging one another supplement themselves to a ship's hull. Moreover the dock is also self-docking.

The flooding of the buoyancy chambers 5 and 6 as well as the filling up of the mantle hollow space 1 with water and also the evacuation is carried out by pumps or a plant of pumps arranged on the testing cylinder by way of example comprising a main bilge pump $a$, arranged near the bottom and driven by the motors $b$, and the filling and pressure-pumps $c$ arranged higher up. Oil motors $d$ drive suitable dynamos for feeding the necessary motors.

We claim:—

A separable dock comprising in combination a testing cylinder itself of a buoyant capacity sufficient to float itself loaded with a submarine, but not the additional weight of the water for testing, and said dock including complementary portions receiving said testing cylinder portion, of sufficient buoyancy to float the latter above water level when loaded with the testing water, said complementary portions being laterally expansible to vary the width of the space within which the testing cylinder portion is received, the sides of said space fitting the testing cylinder portion closely when the complementary portions are in contracted position.

In testimony whereof we have signed our names to this specification.

PAUL MATTHIESSEN.
ADOLF DETLEF MÖLLER.